May 14, 1929. G. W. STEDWELL Re. 17,294
LIQUID DELIVERY SYSTEM
Original Filed Oct. 1, 1927 2 Sheets-Sheet 1
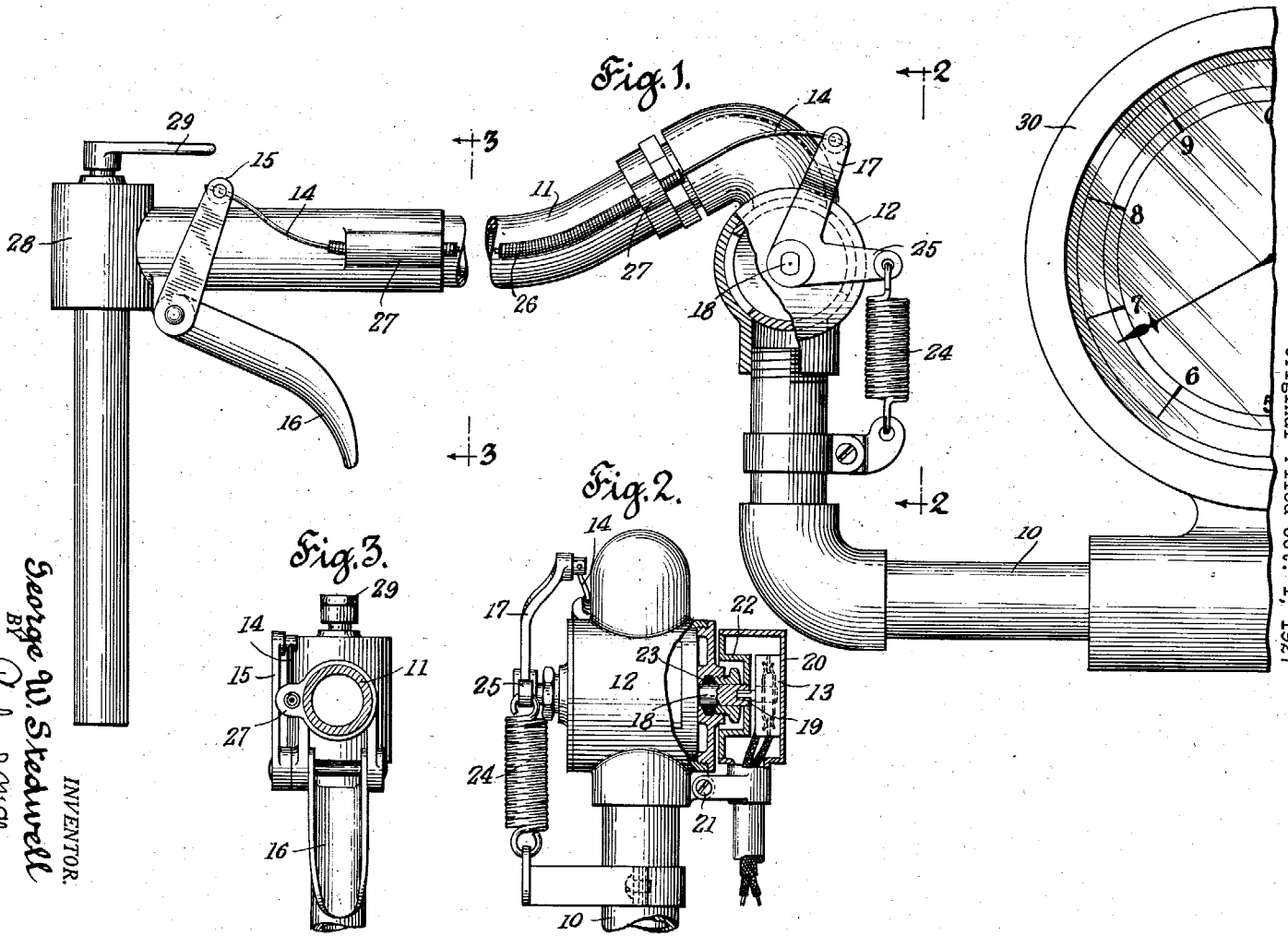
INVENTOR.
George W. Stedwell
BY
Philip S. McGann
ATTORNEY May 14, 1929.
G. W. STEDWELL
LIQUID DELIVERY SYSTEM
Re. 17,294
Original Filed Oct. 1, 1927
2 Sheets-Sheet 2
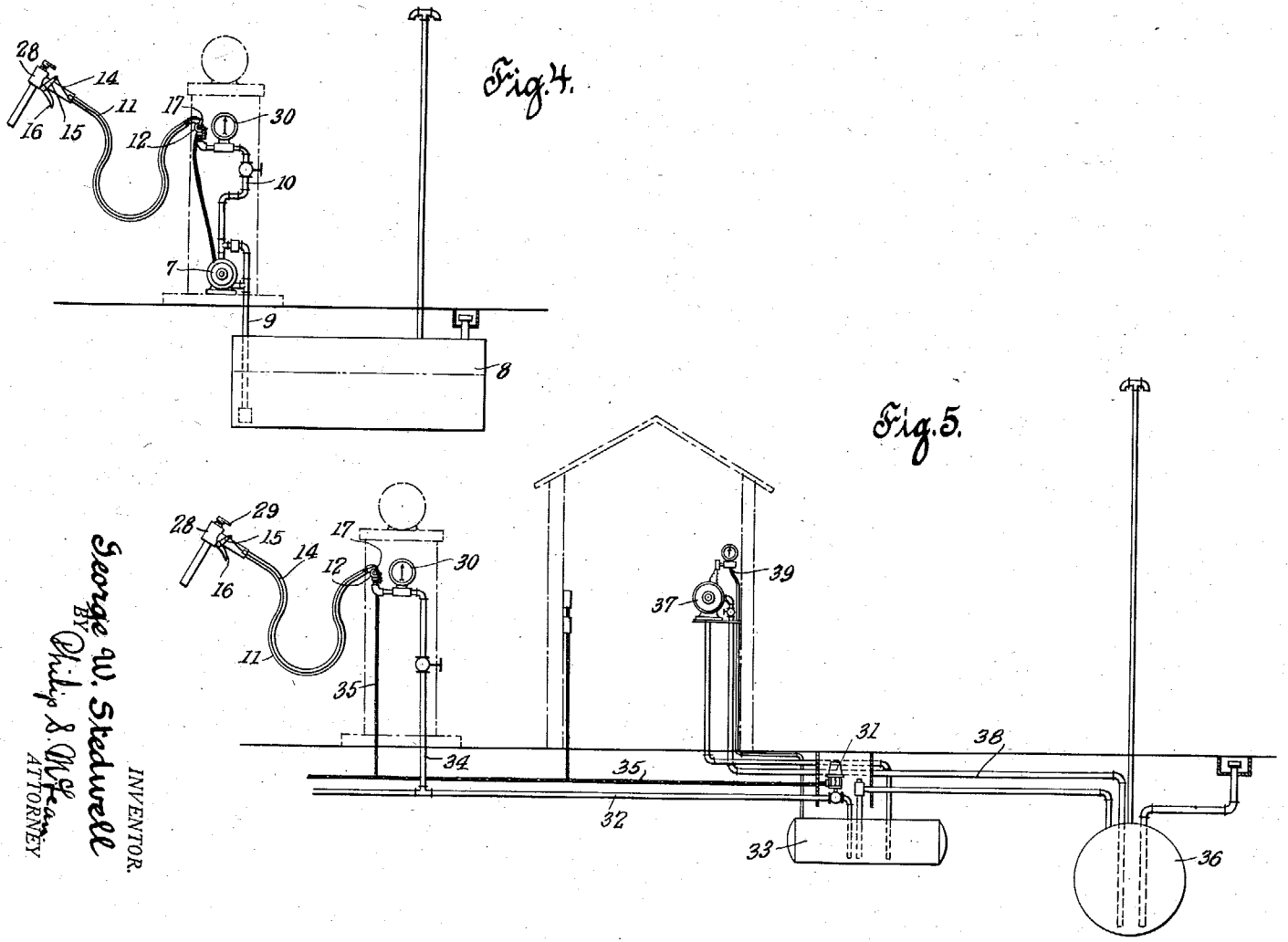
INVENTOR.
George W. Stedwell
BY Philip S. McKean
ATTORNEY Reissued May 14, 1929. Re. 17,294

UNITED STATES PATENT OFFICE.

GEORGE W. STEDWELL, OF BROOKLYN, NEW YORK, ASSIGNOR, BY DIRECT AND MESNE ASSIGNMENTS, TO LIQUID DISPENSING SYSTEMS, INC., A CORPORATION OF NEW YORK.

LIQUID-DELIVERY SYSTEM.

Original No. 1,685,036, dated September 18, 1928, Serial No. 223,255, filed October 1, 1927. Application for reissue filed February 23, 1929. Serial No. 342,235.

This invention relates more particularly to the handling of gasoline and other liquids of a hazardous character and special objects of the invention are to provide a "dry hose" system for the purpose, which will be of simple, practical design, sturdy construction and consisting of but relatively few non-complicated parts capable of withstanding rough usage without getting out of order.

A further special object is to provide a delivery system of the character outlined above, which will be self-protective so as to automatically shut off flow in case of any break in the connections.

These objects and others of a similar desirable nature are attained in this invention by certain novel features of construction, combinations and relations of parts, as will be clear from the following specification.

The drawings accompanying and forming part of the specification illustrate certain practical embodiments of the invention, but it should be understood that the structure and arrangement may vary within the broad scope and intent of the description and claims.

Fig. 1 is a broken part sectional view of the delivery portion of the apparatus, back to the meter.

Figs. 2 and 3 are broken sectional detail views as taken on substantially the lines 2—2 and 3—3 of Fig. 1.

Fig. 4 is an illustration of the complete system in the simple form in which a pump is employed to transfer liquid direct from a storage tank into the discharge hose.

Fig. 5 is a similar illustration of a pressure form of the system in which the pump is automatically controlled to maintain a supply of liquid under pressure in an auxiliary tank, from which the discharge stand or stands derive their supply.

In the simplified or fundamental form of the apparatus shown in Fig. 4, an electric pump illustrated at 7 is embloyed to transfer liquid from the storage tank 8 through lines 9 and 10 to a hose 11 and a continuous flow metered delivery nozzle control is effected by a valve 12 in the delivery line at the head of the hose and a simultaneously operating electric switch 13 controlling the motor.

For simultaneously operating the delivery valve and switch, a Bowden wire connection 14 is provided between the crank 15 of a pivoted nozzle handle 16 and the crank 15 of a pivoted nozzle handle 16 and the crank arm 17 of the valve, the switch, as shown particularly in Fig. 2 being arranged concentrically of the valve shaft 18 and having its arbor suitably keyed in the end of the valve shaft, as indicated at 19. For supporting the switch in this relation, the same is shown carried by a cap or housing 20 detachably secured to the valve head at 21 and to prevent any gasoline or liquid entering the switch box, a cap 22 is shown carried by the valve stem, covering the stuffing box 23 of the valve and serving as a closure to the open inner side of the switch box.

The valve is shown as held in its closed position by a spring 24 connected with an arm 25 on the end of the valve stem and the tension of this spring may be sufficient to normally retain the actuating handle 16 in its extended relation, as in Fig. 1. The Bowden wire may be suitably protected and guided in a flexible conduit 26 co-extensive with and held to the hose by supports or guides 27. The nozzle is shown equipped with a final discharge valve 28 operated by a handle 29, which valve is open when discharge of liquid is to be made under control of the handle 16.

A suitable flow meter 30 in the delivery line, at the inlet end of the hose, enables any desired quantities of liquid to be discharged, governed instantly by the nozzle control.

The individual pump system described has certain advantages in the way of simplicity, few parts, etc., and is particularly advantageous for small installations or places where the demand is uncertain.

For larger installations and in places where the demand is more or less continuous, it is more advantageous to use the pressure system shown in Fig. 5. This system operates on the same general principle as the one first disclosed, the nozzle control through the Bowden wire connection directly operating a delivery valve and an electric switch; but whereas in the first case the electric switch served to control the operation of an electric pump, in the second instance the switch is utilized to control a solenoid valve governing admission of liquid under pressure into the delivery line.

This solenoid valve is shown at 31 interposed in the delivery line 32 leading from the pressure tank 33, said delivery line having branches 34 leading to the different stands.

The wiring from the switches to the solenoid valve may be carried back through a suitable conduit system 35, it being understood that the switch at each stand is connected with the solenoid valve so that said valve will open each time the switch at any one of the delivery stands is closed.

In the particular pressure system illustrated, liquid is drawn from a main storage tank 36 and transferred by a pump 37 through piping 38 to the pressure tank 33 and the delivery line 32 draws its supply from the lower portion of this tank so that a body of air will be held trapped in the pressure tank for maintaining a desired delivery pressure, the pump motor being governed by a pressure control 39 to automatically maintain this pressure.

In the pressure system of Fig. 5, the discharge valve 28 being open, when the nozzle grip 16 is actuated, the Bowden wire connection will pull the valve at the head of the hose open to deliver liquid and simultaneously the switch on the valve head will be thrown to close the circuit of the solenoid valve, which thereupon opens the full force of the pressure tank to the delivery line.

Thus, with the operation of the nozzle grip, the delivery line is opened to the discharge hose and the line is put under the proper delivery pressure. With the release of the grip handle on the nozzle, the delivery valve is automatically closed and substantially simultaneously therewith, the switch is thrown to open the circuit of the solenoid valve, which automatically closes to take the pressure off the delivery line. Thus the delivery line is subjected to pressure only when the delivery valve is opened and there is no standing pressure on the delivery valve or meter. The main or pressure control valve, however, traps the flow-back in the delivery line and branches so that there will be practically a solid body of liquid ready for instant delivery the moment any one of the delivery valves is opened. The system is entirely self-protective because in the event of any break in the circuit, the pressure valve will refuse to operate and any break in the hose will be practically certain to render the Bowden wire connection inoperative.

By reason of the special combination of the so-called "flow meter" for showing the amounts being delivered through the hose, the mechanism for enforcing an uninterrupted flow of liquid through the delivery line and the Bowden wire control extending from the nozzle end of the hose back along the hose to control the operation of such mechanism, an operator or attendant while holding the nozzle and directing the discharge therefrom is able to stop and start the flow from the nozzle either to deliver a predetermined amount or an undetermined amount, such as may be required to fill a tank of unknown capacity and to accomplish this with a continuous uninterrupted flow, the meter showing in each instance, the amount of liquid delivered. Accurate speedy delivery of liquids in a smooth continuous flow, and in any predetermined or uncertain amounts and entirely under control of the operator at the point of discharge, is thus made possible and practical. The Bowden wire is direct and positive in its action and the leverage afforded by the handle of the nozzle makes the grip of the hand sufficient to positively throw the valve, switch or other control means and to easily hold the same in the set position so long as delivery is being made. When the grip on the handle is released, the spring 24 acts as a restoring force to instantly return the parts ready for the next delivery without further attention on the part of the operator.

Aside from the ease and certainty of operation, the leverage afforded by the handle grip is of advantage in assuring proper operation of the control even in extreme cases where the Bowden wire is flexed on shorter curves in bending the hose to meet more inaccessible conditions. While in this case the Bowden wire on the hose is shown as used for operating both a valve and a switch, it will be obvious that the same may be used for operating either a valve or a switch or other form of control device alone. The Bowden wire while free to flex with the hose, is rigidly held against twisting or turning about the hose at both ends, that is at the nozzle end and at the inlet end of the hose by the supports or guides 27, which rigidly fasten the ends of the flexible conduit 26 of the Bowden wire in position on the hose, which construction also causes the wire 14 to assume an easy curve instead of bending sharply where it issues from the flexible conduit or casing.

The Bowden wire constitutes of itself a safety feature, as in accordance with the principles and characteristics of Bowden wire, the casing through which the wire slides supports and guides the wire, so that it will operate freely therethrough at all times and regardless of the flexure of the same, thereby enabling the wire to act always as a positive power transmission connection, operative equally well in all positions of the hose. The feature of Bowden wire operation combined with the hose structure thus gives the operator a positive control over the valve, switch or other control device, independently of pressure of liquid in the line against the valve, valve closing or switch returning springs or the like.

What is claimed is:

1. In liquid delivery apparatus, a delivery line, means controlling supply of liquid thereto, a discharge hose connected with said delivery line, valve means controlling flow in the discharge hose, a controller at the discharge end of said hose, a flexible mechanical connection extending from said controller back along the hose to the delivery valve and means also operable by said mechanical connection to govern the supply controlling means in timed relation with the actuation of the delivery valve.

2. In liquid delivery apparatus, a delivery line, means controlling supply of liquid thereto, a discharge hose connected with said delivery line, valve means controlling flow in the discharge hose, a controller at the discharge end of said hose, a flexible mechanical connection extending from said controller back along the hose to the delivery valve and means also operable by said mechanical connection to govern the supply controlling means in timed relation with the actuation of the delivery valve, said flexible mechanical connection comprising a Bowden wire carried by the hose and flexing with the same.

3. In liquid delivery apparatus, a delivery line, means controlling supply of liquid thereto, a discharge hose connected with said delivery line, valve means controlling flow in the discharge hose, a controller at the discharge end of said hose, a flexible mechanical connection extending from said controller back along the hose to the delivery valve and means also operable by said mechanical connection to govern the supply controlling means in timed relation with the actuation of the delivery valve, the supply governing means comprising an electrical flow governing device and the controller therefor comprising an electric switch coupled with the delivery valve.

4. Liquid delivery apparatus comprising in combination with a liquid supply source, a liquid delivery line and electrically governed mechanism controlling flow from the source to said delivery line, a discharge hose connected with the delivery line, a valve governing admission from the delivery line to the hose, an electric switch coupled with said valve and controlling the electric supply means aforesaid and a Bowden wire connection extending from the discharge end of the hose back to said delivery valve and freely flexible with the flexing of the hose.

5. In liquid delivery apparatus, a liquid supply tank, a liquid delivery line extending therefrom, a valve in said delivery line for governing admission of liquid from the tank to said line, a valve at the end of the delivery line for controlling flow therefrom, a liquid discharge connection extending from the end of the delivery line and means for substantially simultaneously operating said supply and delivery valves in the delivery line, including a Bowden wire connection extending back along the discharge extension from the discharge end of the same.

6. In liquid delivery apparatus, a discharge hose having a delivery nozzle, a control handle on said nozzle, a Bowden wire flexible mechanical connection extending from said handle back along the hose, a delivery valve at the entrance end of the hose, spring means for normally holding said delivery valve closed and connecting means between said valve and Bowden wire for enabling operation of the control handle at the nozzle to effect the opening of the valve against the tension of the valve closing spring.

7. In liquid delivery apparatus, a discharge hose having a delivery nozzle, a control handle on said nozzle, a Bowden wire flexible mechanical connection extending from said handle back along the hose, a delivery valve at the entrance end of the hose, spring means for normally holding said delivery valve closed, connecting means between said valve and Bowden wire for enabling operation of the control handle at the nozzle to effect the opening of the valve against the tension of the valve closing spring, an electric switch mechanically coupled with said valve, a liquid delivery line in supply relation to the valve and an electrically actuated liquid flow governing device in said delivery line electrically connected with said switch.

8. In liquid delivery apparatus, a discharge hose having a delivery nozzle, a control handle on said nozzle, a Bowden wire flexible mechanical connection extending from said handle back along the hose, a delivery valve at the entrance end of the hose, spring means for normally holding said delivery valve closed, connecting means between said valve and Bowden wire for enabling operation of the control handle at the nozzle to effect the opening of the valve against the tension of the valve closing spring, an electric switch mechanically coupled with said valve, a liquid delivery line in supply relation to the valve and an electrically actuated liquid flow governing device in said delivery line electrically connected with said switch, said parts being so related that actuation of the nozzle handle will effect opening of the delivery valve and supply of liquid to the delivery line and a flow meter in the line of liquid flow for registering amounts of liquid discharged from the hose.

9. In liquid delivery apparatus, the combination with a liquid delivery line and a delivery hose at the end of the same, a valve controlling admission from the delivery line to said hose and a more remote valve for controlling admission of liquid under pressure into the delivery line, a Bowden wire control on the hose and flexible therewith, an operating device for said Bowden wire control at the delivery end of the hose and connecting means for enabling said Bowden wire control to effect substantially simultaneous operation of said relatively near and remote valves of the delivery line.

10. In liquid delivery apparatus, the combination with a liquid delivery line and a delivery hose at the end of the same, a valve controlling admission from the delivery line to said hose and a more remote valve for controlling admission of liquid under pressure into the delivery line, a Bowden wire control on the hose and flexible therewith, an operating device for said Bowden wire control at the delivery end of the hose and connecting means for enabling said Bowden wire control to effect substantially simultaneous operation of said relatively near and remote valves of the delivery line, one of said valves being of the electrically operated type and the connections aforesaid including an electric switch for controlling the electrically operated valve.

11. In liquid delivery apparatus, the combination with a liquid delivery line and a delivery hose at the end of the same, a valve controlling admission from the delivery line to said hose and a more remote valve for controlling admission of liquid under pressure into the delivery line, a Bowden wire control on the hose and flexible therewith, an operating device for said Bowden wire control at the delivery end of the hose and connecting means for enabling said Bowden wire control to effect substantially simultaneous operation of said relatively near and remote valves of the delivery line, one of said valves being of the electrically operated type and the connections aforesaid including an electric switch for controlling the electrically operated valve, the other valve being of the mechanically operated type and the connections for operating the same being of a mechanical nature.

12. In liquid delivery apparatus, a liquid delivery line, a delivery hose at the discharge end of the same, an electric switch adjacent the entry end of said hose, a Bowden wire control extending from the delivery end of the hose back to said switch, whereby said switch located at a point removed from the discharge end of the hose is positively mechanically operated from the delivery end of the hose and valve means for the delivery line controlled by said switch.

13. In liquid delivery apparatus, the combination of a flexible delivery hose having a nozzle at one end, a hand lever mounted on the nozzle end of the hose, a valve at the opposite end of the hose and a Bowden wire mounted on the hose and flexible therewith, said Bowden wire including a power transmission wire connected at one end with the hand lever and at the opposite end with the valve and a flexible conduit encasing said transmission wire between the ends thereof, rigidly clamped against turning relative to the hose.

14. In liquid delivery apparatus, the combination of a flexible delivery hose having a nozzle at one end, a hand lever mounted on the nozzle end of the hose, a valve at the opposite end of the hose and a Bowden wire mounted on the hose and flexible therewith, said Bowden wire including a power transmission wire connected at one end with the hand lever and at the opposite end with the valve, a flexible conduit encasing, said transmission wire between the ends thereof rigidly clamped against turning relative to the hose and means whereby said valve will be automatically closed and the wire connection between the hand lever and valve retracted in its conduit when the hand lever is released.

15. In liquid delivery apparatus, the combination of a flexible delivery hose having a nozzle at one end, a hand lever mounted on the nozzle end of the hose, a valve at the opposite end of the hose and a Bowden wire mounted on the hose and flexible therewith, said Bowden wire including a power transmission wire connected at one end with the hand lever and at the opposite end with the valve, a flexible conduit encasing, said transmission wire between the ends thereof rigidly clamped against turning relative to the hose and spring means operating on the valve to close the same and restore the hand lever to a predetermined position when the hand lever is released.

16. In liquid delivery apparatus, a flexible delivery hose supported at one end and having a discharge nozzle at the opposite end, an operating device mounted at the nozzle end of the hose, a controlling device mounted adjacent the supported end of the hose and a Bowden wire control comprising a flexible conduit carried by the hose and flexible therewith and a flexible transmission wire operating freely in said flexible conduit, said transmission wire being connected with said operating device at the nozzle end of the hose and with said control device at the supported end of the hose and an uninterrupted flow liquid delivery line in connection with the supported end of the hose, said control device governing and determining continuous, uninterrupted delivery of liquid by the hose entirely by the use of the operating device at the nozzle end of the hose.

17. In liquid delivery apparatus, a flexible delivery hose supported at one end and having a discharge nozzle at the opposite end, an operating device mounted at the nozzle end of the hose, a controlling device mounted adjacent the supported end of the hose and a Bowden wire control comprising a flexible conduit carried by the hose and flexible therewith and a flexible transmission wire operating freely in said flexible conduit, said transmission wire being connected with said operating device at the nozzle end of the hose and with said control device at the supported end of the hose and an uninterrupted flow liquid delivery line in connection with the supported end of the hose, said control device governing and determining continuous, uninterrupted delivery of liquid by the hose entirely by the use of the operating device at the nozzle end of the hose and a flow meter in the delivery line for registering varying amounts continuously delivered by the hose under the action of said operating device at the nozzle end of the hose.

18. An uninterrupted flow, metering, liquid delivery system, comprising in combination with a liquid delivery line and means associated therewith for delivering liquid therethrough uninterruptedly in varying desired volumes, a flow meter in said liquid delivery line, a flexible liquid dispensing hose in connection with and forming a continuation of said liquid delivery line, a rocking hand lever mounted on the discharge end of said hose, control means for governing the delivery of the liquid, said control means being mounted adjacent the opposite end of the hose, Bowden wire operating means including a flexible power transmission wire connection positively guided in freely flexing relation the length of the hose, means for connecting the end of said positively but flexibly guided wire connection with the control means adjacent one end of the hose and means for connecting the opposite end of said wire connection with the hand lever at the discharge end of the hose whereby to enable operation of the hand lever at the discharge end of the hose to control continuous metering and delivery of liquid continuously in various desired quantities.

19. An uninterrupted flow, metering, liquid delivery system, comprising in combination with a liquid delivery line and means associated therewith for delivering liquid therethrough uninterruptedly in varying desired quantities, a flow meter in said liquid delivery line, a flexible liquid dispensing hose in connection with and forming a continuation of said liquid delivery line, a readily operable movable actuating member on the discharge end of the hose, means adjacent the opposite end of the hose for controlling flow of the liquid, Bowden wire operating means including a flexible power transmission wire connection positively guided in freely flexing sliding relation with the length of the hose, means for connecting the end of said positively directed flexibly sliding wire connection with said control means adjacent the one end of the hose and means for connecting the opposite end of said wire connection with the movable actuating member at the discharge end of the hose, whereby the latter will be effective to determine delivery of liquid through the hose in continuously flowing, various, metered quantities under all conditions of flexure of the hose and positively guided freely sliding power transmission wire.

In testimony whereof, I affix my signature.

GEORGE W. STEDWELL.